United States Patent
Lee et al.

(10) Patent No.: US 10,826,064 B2
(45) Date of Patent: Nov. 3, 2020

(54) CATHODE ACTIVE MATERIAL FOR LITHIUM SECONDARY BATTERY, METHOD FOR PRODUCING SAME, AND LITHIUM SECONDARY BATTERY COMPRISING SAME

(71) Applicant: Samsung SDI Co., Ltd., Yongin-si, Gyeonggi-do (KR)

(72) Inventors: Daehoe Lee, Yongin-si (KR); Dongjin Kim, Yongin-si (KR); Minhan Kim, Yongin-si (KR); Ilseok Kim, Yongin-si (KR); Dohyung Park, Yongin-si (KR); Junseok Park, Yongin-si (KR); Okgyu Lim, Yongin-si (KR); Gyuran Jeon, Yongin-si (KR); Jeonjin Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/327,244

(22) PCT Filed: Sep. 4, 2017

(86) PCT No.: PCT/KR2017/009652
§ 371 (c)(1),
(2) Date: Feb. 21, 2019

(87) PCT Pub. No.: WO2018/048155
PCT Pub. Date: Mar. 15, 2018

(65) Prior Publication Data
US 2019/0181445 A1     Jun. 13, 2019

(30) Foreign Application Priority Data

Sep. 6, 2016 (KR) ........................ 10-2016-0114631

(51) Int. Cl.
*H01M 4/00* (2006.01)
*H01M 4/525* (2010.01)
(Continued)

(52) U.S. Cl.
CPC ............ *H01M 4/525* (2013.01); *C01G 53/42* (2013.01); *C01G 53/50* (2013.01); *H01M 4/131* (2013.01);
(Continued)

(58) Field of Classification Search
CPC ................. H01M 4/525; H01M 4/131; H01M 2004/028; H01M 10/0525
See application file for complete search history.

(56) References Cited

U.S. PATENT DOCUMENTS

| | | |
|---|---|---|
| 2014/0087262 A1 | 3/2014 | Imahashi et al. |
| 2014/0186709 A1 | 7/2014 | Iwanaga et al. |

(Continued)

FOREIGN PATENT DOCUMENTS

| | | |
|---|---|---|
| JP | 2008-137837 A | 6/2008 |
| JP | 2012-230898 A | 11/2012 |

(Continued)

OTHER PUBLICATIONS

Kim, Jisuk et al., "Washing Effect of a $LiNi_{0.83}Co_{0.15}Al_{0.02}O_2$ Cathode in Water," Electrochemical and Solid-State Letters, vol. 9, 2006, 5 pages.

(Continued)

*Primary Examiner* — Jane J Rhee
(74) *Attorney, Agent, or Firm* — Lewis Roca Rothgerber Christie LLP (57) ABSTRACT

The present disclosure relates to a cathode active material for a lithium secondary battery, a method for preparing same, and a lithium secondary battery comprising same, the cathode active material comprising a lithium-nickel com- (Continued)

pound oxide, wherein a c-axis lattice parameter of a unit lattice of the lithium-nickel compound oxide satisfies Formula 1:

$$14.1720 \text{ Å} \leq c \leq 14.1750 \text{ Å} \quad \text{[Formula 1]}$$

10 Claims, 5 Drawing Sheets

(51) Int. Cl.
    *H01M 10/0525*      (2010.01)
    *H01M 4/131*      (2010.01)
    *C01G 53/00*      (2006.01)
    *H01M 4/02*      (2006.01)

(52) U.S. Cl.
    CPC ..... *H01M 10/0525* (2013.01); *C01P 2002/54* (2013.01); *C01P 2002/72* (2013.01); *C01P 2002/76* (2013.01); *C01P 2002/77* (2013.01); *C01P 2006/40* (2013.01); *H01M 2004/028* (2013.01)

(56) References Cited

U.S. PATENT DOCUMENTS

| | | |
|---|---|---|
| 2015/0194662 A1 | 7/2015 | Yang et al. |
| 2015/0236346 A1 | 8/2015 | Park et al. |

FOREIGN PATENT DOCUMENTS

| | | |
|---|---|---|
| KR | 10-2014-0039000 A | 3/2014 |
| KR | 10-2015-0079362 A | 7/2015 |
| KR | 10-2015-0080199 A | 7/2015 |
| KR | 10-2015-0097023 A | 8/2015 |

OTHER PUBLICATIONS

Sathiya, M. et al., "Nitrates—melt synthesized $LiNi_{0.8}Co_{0.2}O_2$ and its performance as cathode in Li-ion cells," Bull. Mater. Sci., vol. 34, No. 7, Dec. 2011, 6 pages.

EPO Extended Search Report dated Apr. 16, 2020, for corresponding European Patent Application No. 17849039.7, 8 pages.

CATHODE ACTIVE MATERIAL FOR LITHIUM SECONDARY BATTERY, METHOD FOR PRODUCING SAME, AND LITHIUM SECONDARY BATTERY COMPRISING SAME

CROSS-REFERENCE TO RELATED APPLICATION(S)

This application is a National Phase Patent Application of International Patent Application Number PCT/KR2017/009652, filed on Sep. 4, 2017, which claims priority of Korean Patent Application No. 10-2016-0114631, filed Sep. 6, 2016. The entire contents of both of which are incorporated herein by reference.

TECHNICAL FIELD

This disclosure relates to a cathode active material for a lithium secondary battery, a method of producing the same, and a lithium secondary battery including the same.

BACKGROUND ART

Recently, miniaturization and weight reduction of a mobile information terminal device have progressed rapidly, and a lithium secondary battery, which is a driving power source thereof, is required to have a higher capacity.

Also, as markets for hybrid vehicles or electric vehicles are expanded, researches have actively been made in order to use lithium secondary batteries as their driving power sources or power storage power sources.

A cathode active material of such a lithium secondary battery may include oxides including lithium and transition elements, which has a structure capable of intercalating lithium ions, such $LiCoO_2$, $LiMn_2O_4$, or $LiNi_{1-x}Co_xO_2$ ($0<x<1$).

DISCLOSURE

Technical Problem

An embodiment of this disclosure is to provide a cathode active material for a lithium secondary battery having high capacity and excellent cycle-life characteristics.

Another embodiment of this disclosure is to provide a method of preparing the cathode active material.

Another embodiment of this disclosure is to provide a lithium secondary battery including the cathode active material.

Technical Solution

In one aspect, this disclosure provides a cathode active material for a lithium secondary battery including lithium nickel composite oxide, wherein a lattice parameter of a unit lattice of the lithium nickel composite oxide satisfies Formula 1.

$$14.1720 \text{ Å} \leq c \leq 14.1750 \text{ Å} \quad \text{[Formula 1]}$$

In another aspect, this disclosure provides a method of producing a cathode active material for a lithium secondary battery including mixing a nickel precursor and a lithium precursor to prepare a mixture and primarily firing the mixture, pulverizing the primarily-fired product and washing the same, drying the washed primarily-fired product, and secondarily firing the dried primarily-fired product, wherein the washing is performed so that a ratio of the pulverized primarily-fired product and washing water is 0.5:1 to 1:10.

In another aspect, this disclosure provides a lithium secondary battery including a cathode including the cathode active material, an anode including an anode active material, and an electrolyte.

Advantageous Effects

The cathode active material for a lithium secondary battery according to an embodiment of this disclosure and a cathode active material produced according to the preparation method may have high capacity and may provide a lithium secondary battery having cycle-life characteristics.

BEST MODE

The present invention will be described more fully hereinafter with reference to the accompanying drawings, so that a person having an ordinary skill in this art may perform embodiments easily. However, the present invention may be embodied in many different forms and is not construed as limited to the example embodiments set forth herein.

In addition, unless explicitly described to the contrary, the word "comprise" and variations such as "comprises" or "comprising," will be understood to imply the inclusion of stated elements but not the exclusion of any other elements.

There are several kinds of cathode active materials used in lithium secondary batteries and among them, a cathode active material using lithium cobalt oxide, that is, $LiCoO_2$, is most widely used currently. However, the cathode active material using lithium cobalt oxide may cause an increase in a preparation cost due to the uneven distribution and scarcity of cobalt, and thus it is difficult to supply the cathode active material with stability.

In order to solve this problem, various researches have been carried out to apply a substitute material for cobalt and for example, there is an attempt to develop a cathode active material using low cost nickel (Ni) or manganese (Mn) alone or compositely instead of expensive cobalt.

Of these, nickel (Ni) based composite oxides have been actively studied as materials capable of overcoming limitations such as cost, stability, and capacity of materials such as $LiCoO_2$, $LiNiO_2$, $Li_2MnO_3$, and the like.

In this regard, the nickel (Ni)-based composite oxide reacts to generate two electrons as in $Ni^{2+} \rightarrow Ni^{4+}+2e$ in a charging reaction in which one lithium atom exits, so that there is an advantage that the capacity increases as the nickel (Ni) content increases compared with other elements such as cobalt (Co), manganese (Mn), and the like which generate only one electron.

However, in the case of a nickel (Ni)-based composite oxide, the amount of lithium remaining on the surface is large, and when it is applied to a lithium secondary battery, cycle characteristics may be degraded, stability may be lowered, and it is impossible to use it for a long time.

Accordingly, the inventors of the present invention have conducted studies to realize a lithium secondary battery having a high capacity and excellent cycle-life characteristics while using a nickel (Ni)-based composite oxide as a cathode active material for a lithium secondary battery and as a result, when the lattice parameter c value of the cathode active material satisfies a predetermined range, it is possible to achieve the above-mentioned object, and an embodiment of the present disclosure has been implemented.

More specifically, the cathode active material for a lithium secondary battery according to an embodiment of the present invention includes a lithium nickel composite oxide, and a c-axis lattice parameter of the unit lattice of the lithium nickel composite oxide is represented by Formula 1.

$$14.1720 \text{ Å} \leq c \leq 14.1750 \text{ Å} \quad \text{[Formula 1]}$$

In Formula 1, the c-axis lattice parameter may be greater than or equal to 14.172 Å and less than or equal to 14.175 Å, and more specifically greater than or equal to 14.172 Å and less than or equal to 14.174 Å. When the c-axis lattice parameter of the lithium nickel composite oxide satisfies the range, structural stability of crystal lattice including the unit lattice may be improved.

More specifically, when an amount of residual lithium present on the surface of lithium nickel composite oxide in the cathode active material of the present disclosure is decreased through washing processes, a c-axis of the unit lattice of the lithium nickel composite oxide may satisfy the above range. In this case, a strain applied to the crystal structure may be decreased by repetition of intercalation/deintercalation of lithium ions upon charge and discharge. Therefore, even when a large amount of lithium ions are deintercalated from the lithium cobalt oxide, the crystal structure may be stabilized.

In the present disclosure, the c-axis lattice parameter may be determined by X-ray Rietveld refinement.

On the other hand, the lithium nickel composite oxide may include a lithium compound disposed on a surface of the lithium nickel composite oxide. Herein, an amount of lithium included in the lithium compound may be less than or equal to 0.25 parts by weight, and more specifically 0.05 parts by weight to 0.15 parts by weight based on 100 parts by weight of the cathode active material.

When the amount of the lithium included in the lithium compound disposed on the surface of the lithium nickel composite oxide satisfies the above numerical range, cycle-life characteristics of a lithium secondary battery may be improved and a lithium secondary battery having excellent electrochemical characteristics may be realized.

The cathode active material in which lithium within the amount range is present on the surface of the lithium nickel composite oxide may be obtained by suitably controlling washing conditions in a washing process after synthesizing the lithium nickel composite oxide. A method of producing the cathode active material using the washing process will be described later.

The lithium compound disposed on the surface of the lithium nickel composite oxide may be $Li_2CO_3$, $LiOH$, or a combination thereof.

On the other hand, the lithium nickel composite oxide may be represented by Chemical Formula 1.

$$Li_p(Ni_xCo_yMe_z)O_2 \quad \text{[Chemical Formula 1]}$$

In Chemical Formula 1, $0.9 \leq p \leq 1.1$, $0.8 \leq x \leq 0.9$, $0 < y \leq 0.3$, $0 < z \leq 0.3$, $x+y+z=1$, and Me is at least one of Al, Mn, Mg, Ti, and Zr.

When the nickel-containing lithium metal oxide having a high nickel amount such as the lithium metal oxide represented by Chemical Formula 1 is used as a cathode active material, a high-capacity lithium secondary battery may be realized.

More specifically, the amount of nickel in the lithium metal oxide according to the present disclosure may be greater than or equal to 0.8 and less than or equal to 0.9, as confirmed in Chemical Formula 1. When the amount of nickel in the lithium metal oxide satisfies the range, a lithium secondary battery having a high capacity and cycle-life characteristics may be realized.

In addition, Me of Chemical Formula 1 may desirably be Al or Mn considering a producing process and cost of the cathode active material.

The cathode active material of the present disclosure does not have other diffraction peaks other than a diffraction peak of a (101) plane in a range of 2θ=25 degrees (°) to 38 degrees (°) in an X-ray diffraction (XRD) measurement. In other words, the lithium metal oxide of the present disclosure exhibits an R-3m crystal structure, that is, a rhombohedral crystal structure, and therefore, in an X-ray diffraction (XRD) measurement, other additional phases do not appear between a diffraction peak of a (003) plane and a diffraction peak of a (101) plane.

In the present specification, the X-ray diffraction measurement is a measurement using a CuKα ray as a target ray. Diffraction peaks other than the diffraction peak of the (101) plane at 2θ=25 degrees (°) to 38 degrees (°) in the XRD measurement of the cathode active material indicate formation of impurities, for example $Co_3O_4$. When the cathode active material includes impurities, this is not an electrochemically active material and therefore does not contribute to the capacity of the battery. Further, such impurities may act as a cause of increase in resistance because they decrease the migration speed of lithium ions on the surface of the cathode active material, and may deteriorate capacity and cycle-life characteristics of the battery.

However, it may be understood that the cathode active material according to the present disclosure will exhibit more improved capacity and cycle-life characteristics since impurities, that is, $Co_3O_4$, are not produced as described above.

Hereinafter, a method of producing a cathode active material according to another embodiment of the present disclosure is described.

The method of the cathode active material for a lithium secondary battery according to according to an embodiment of this disclosure includes a primarily firing process, a washing process, a drying process, and a secondarily firing process.

The primarily firing process may be performed after mixing a nickel precursor and a lithium precursor to prepare a mixture.

The nickel precursor may be, for example, nickel acetate, nickel nitrate, nickel carbonate, hydrates thereof, or a combination thereof.

The lithium precursor may be, for example, lithium acetate, lithium nitrate, lithium hydroxide, lithium carbonate, lithium acetate, hydrates thereof, or a combination thereof.

A mixing ratio of the nickel precursor and the lithium precursor may be appropriately adjusted so as to obtain the compound of Chemical Formula 1. The mixing may be, for example, performed by a mechanical mixing process such as ball milling.

The primarily firing process may be performed at 650° C. to 850° C. and herein a heat-treating time may be 10 hours to 30 hours. The firing process may be performed under an oxygen ($O_2$) atmosphere.

Then, the primarily-fired product is pulverized and then is subjected to the washing process.

Particularly, in the present disclosure, the washing is performed so that a weight ratio of the pulverized primarily-fired product and washing water may be 0.5:1 to 1:10, and more specifically 0.5:1 to 1:8.

When the washing is performed in the weight ratio of the pulverized primarily-fired product and washing water within the above ranges, an amount of residual lithium present on the surface may be decreased while minimizing the change of the active material including the lithium nickel composite oxide, and thus cycle-life characteristics may be further improved.

The washing water may be, for example, distilled water or ammonia water, and in this disclosure, the distilled water may be effective in terms of washing efficiency.

The washed primarily-fired product is subjected to a drying process to be dehydrated. The drying may be performed by heat-treating the product at a temperature of less than or equal to 200° C., and more specifically 100° C. to 180° C. for 10 hours to 30 hours. In this way, through the drying process, the lithium nickel composite oxide included in the cathode active material of the present disclosure may be produced so that the c-axis lattice parameter of the unit lattice may be within the range. Accordingly, cycle-life characteristics may be further improved.

Next, the secondarily firing process is performed.

The secondarily firing process may be performed at a temperature of greater than or equal to 600° C., and more specifically 650° C. to 850° C. and herein a heat-treating time may be 10 hours to 30 hours. The heat treating process may be performed under an oxygen ($O_2$) atmosphere.

Then, the secondarily-fired product may be pulverized to produce the cathode active material according to the present disclosure.

Hereinafter, a lithium secondary battery according to another embodiment of the present disclosure is described.

Figure 1:
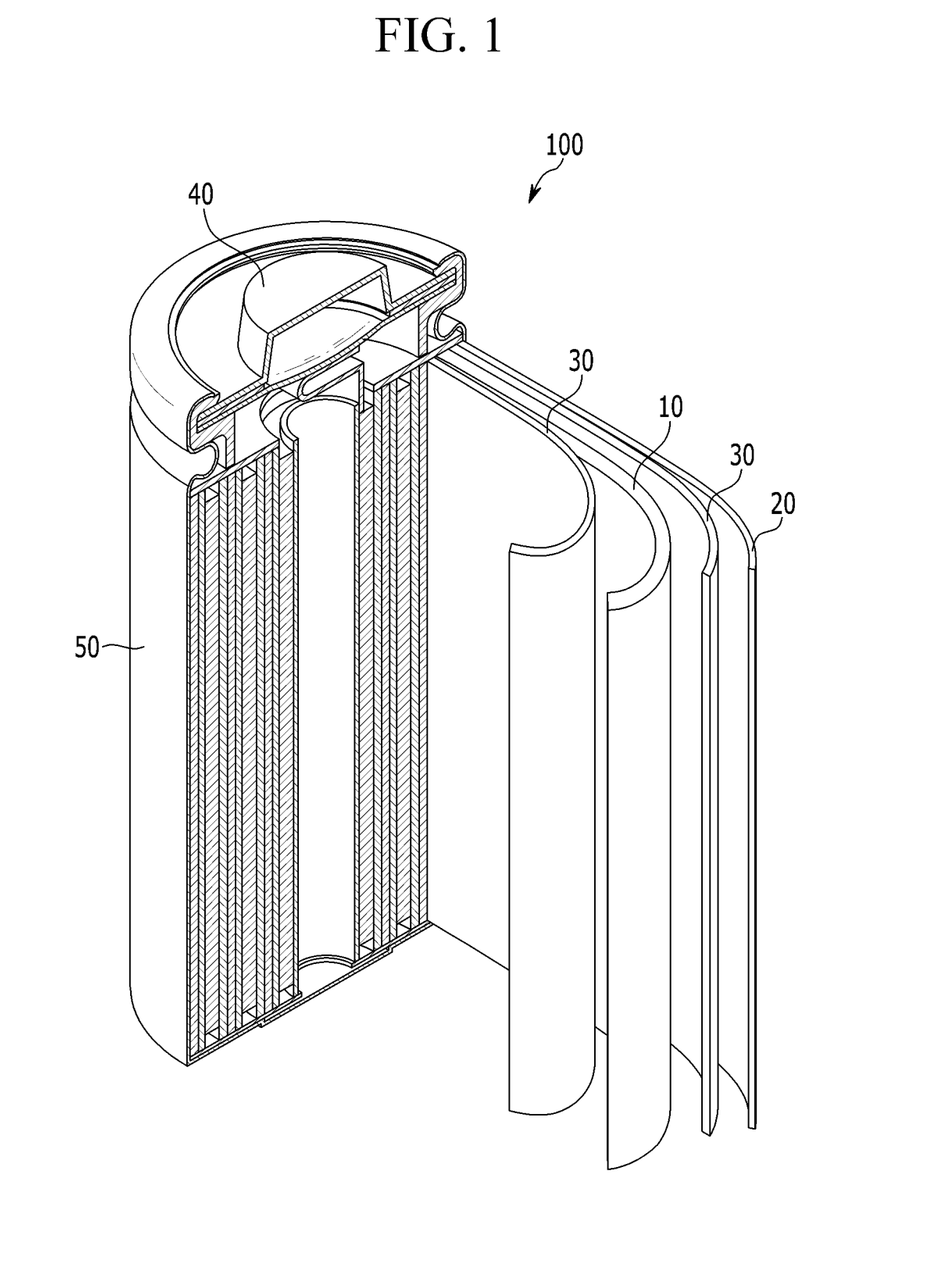
FIG. 1 is a schematic view showing a structure of a lithium secondary battery according to an embodiment of this disclosure.

FIG. 1 is a schematic view showing a structure of a lithium secondary battery according to an embodiment of this disclosure.

Referring to FIG. 1, a lithium secondary battery 100 according to an embodiment may include an electrode assembly, a case 50 configured to house the electrode assembly, and a sealing member 40 configured to seal the case 50.

The electrode assembly includes a cathode 10 including the cathode active material, an anode 20 including an anode active material, and a separator 30 disposed between the cathode 10 and the anode 20. The cathode 10, the anode 20, and the separator 30 may be impregnated in the electrolyte (not shown).

The electrode assembly may have a wound shape where the separator 30 is disposed between the cathode 10 and the anode 20. FIG. 1 illustrates a spiral-wound electrode assembly for convenience, but the present disclosure is not limited thereto. For example, the electrode assembly may have a structure a plurality of sheet-shaped cathodes and anodes are alternately stacked while separators are placed therebetween.

The cathode 10 includes a cathode active material layer and a current collector supporting the cathode active material. In the cathode active material layer, an amount of the cathode active material may be 90 wt % to 98 wt % based on a total weight of the cathode active material layer.

In an embodiment of the present invention, the cathode active material layer may further include a binder and a conductive material. Herein, each amount of the binder and conductive material may be 1 wt % to 5 wt % based on a total weight of the cathode active material layer.

The binder serves to adhere the cathode active material particles to each other and to adhere the cathode active material to a current collector. Examples of the binder may be polyvinylalcohol, carboxylmethyl cellulose, hydroxypropyl cellulose, diacetyl cellulose, polyvinyl chloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material improves electrical conductivity of an electrode and may be any electrically conductive material may be used as a conductive material, unless it causes a chemical change. Examples of the conductive material may be a carbon-based material such as natural graphite, artificial graphite, carbon black, acetylene black, ketjen black, a carbon fiber, and the like; a metal-based material such as a metal powder or a metal fiber of copper, nickel, aluminum, silver, and the like; a conductive polymer such as a polyphenylene derivative; or a mixture thereof.

The current collector may be Al but is not limited thereto.

The anode 20 includes a current collector and an anode active material layer disposed on the current collector and including an anode active material.

The anode active material a material that reversibly intercalates/deintercalates lithium ions, a lithium metal, a lithium metal alloy, a material capable of doping and dedoping lithium, or a transition metal oxide.

The material that reversibly intercalates/deintercalates lithium ions is a carbon material, and may be any generally-used carbon-based anode active material in a lithium ion secondary battery, and examples thereof may be crystalline carbon, amorphous carbon, or a combination thereof. Examples of the crystalline carbon may be a graphite such as a shapeless, sheet-shaped, flake, spherical shaped or fiber-shaped natural graphite or artificial graphite, and examples of the amorphous carbon may be soft carbon or hard carbon, a mesophase pitch carbonized product, fired cokes, and the like.

The lithium metal alloy may include an alloy of lithium and a metal selected from the group consisting of Na, K, Rb, Cs, Fr, Be, Mg, Ca, Sr, Si, Sb, Pb, In, Zn, Ba, Ra, Ge, Al, and Sn.

The material capable of doping and dedoping lithium may be Si, a Si—C composite, $SiO_x$ (0<x<2), a Si-Q alloy (wherein Q is an element selected from the group consisting of an alkali metal, an alkaline-earth metal, a Group 13 element, a Group 14 element, a Group 15 element, a Group 16 element, a transition element, a rare earth element, and a combination thereof, and not Si), Sn, $SnO_2$, a Sn—R alloy (wherein R is an element selected from the group consisting of an alkali metal, an alkaline-earth metal, a Group 13 element, a Group 14 element, a Group 15 element, a Group 16 element, a transition element, a rare earth element, and a combination thereof, and not Sn), and the like, and at least one thereof may be mixed with $SiO_2$. The elements Q and R may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

The transition metal oxide may be vanadium oxide, lithium vanadium oxide, or lithium titanium oxide.

In the anode active material layer, an amount of the anode active material may be 95 wt % to 99 wt % based on a total amount of the anode active material layer.

In an embodiment of the present invention, the anode active material layer may include a binder, and optionally a conductive material. In the anode active material layer, an amount of the binder may be 1 wt % to 5 wt % based on a total amount of the anode active material layer. When the conductive material is further included, 90 wt % to 98 wt % of the anode active material, 1 wt % to 5 wt % of the binder, and 1 wt % to 5 wt % of the conductive material may be used.

The binder serves to adhere the anode active material particles to each other and to adhere the anode active material to a current collector. The binder includes a non-water-soluble binder, a water-soluble binder, or a combination thereof.

The non-water-soluble binder may be selected from polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may be a rubber-based binder or a polymer resin binder. The rubber-based binder may be selected from a styrene-butadiene rubber, an acrylated styrene-butadiene rubber (SBR), an acrylonitrile-butadiene rubber, an acrylic rubber, a butyl rubber, a fluorine rubber, and a combination thereof. The polymer resin binder may be selected from polytetrafluoroethylene, polyethylene, polypropylene, ethylenepropylene copolymer, polyethyleneoxide, polyvinylpyrrolidone, polyepichlorohydrin, polyphosphazene, polyacrylonitrile, polystyrene, an ethylenepropylenediene copolymer, polyvinylpyridine, chlorosulfonated polyethylene, latex, a polyester resin, an acrylic resin, a phenolic resin, an epoxy resin, polyvinyl alcohol, and a combination thereof.

When the water-soluble binder is used as the anode binder, a cellulose-based compound may be further used to provide viscosity as a thickener. The cellulose-based compound includes one or more of carboxylmethyl cellulose, hydroxypropylmethyl cellulose, methyl cellulose, or alkali metal salts thereof. The alkali metal may be Na, K, or Li. Such a thickener may be included in an amount of 0.1 parts by weight to 3 parts by weight based on 100 parts by weight of the anode active material.

The conductive material is included to provide electrode conductivity and any electrically conductive material may be used as a conductive material unless it causes a chemical change in a battery. Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof.

The electrolyte includes a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may include methyl acetate, ethyl acetate, n-propyl acetate, dimethyl acetate, methyl propionate, ethyl propionate, decanolide, mevalonolactone, caprolactone, and the like. The ether-based solvent may include dibutyl ether, tetraglyme, diglyme, dimethoxyethane, 2-methyltetrahydrofuran, tetrahydrofuran, and the like. In addition, the ketone-based solvent may be cyclohexanone, and the like. The alcohol based solvent may include ethanol, isopropyl alcohol, and the like, and the aprotic solvent may include nitriles such as R—CN (wherein R is a C2 to C20 linear, branched, or cyclic hydrocarbon group, a double bond, an aromatic ring, or an ether bond), and the like, amides such as dimethyl formamide, and the like, dioxolanes such as 1,3-dioxolane, and the like, sulfolanes, and the like.

The organic solvent may be used alone or in a mixture and when the organic solvent is used in a mixture, a mixture ratio may be controlled in accordance with a desirable battery performance, which may be understood by a person having an ordinary skill in this art.

In addition, the carbonate-based solvent may include a mixture of a cyclic carbonate and a linear (chain) carbonate. In this case, when the cyclic carbonate and the linear carbonate may be mixed together in a volume ratio of 1:1 to 1:9, performance of an electrolyte solution may be enhanced.

The organic solvent may further include an aromatic hydrocarbon-based organic solvent in addition to the carbonate-based solvent. Herein, the carbonate-based solvent and the aromatic hydrocarbon-based organic solvent may be mixed in a volume ratio of 1:1 to 30:1.

The aromatic hydrocarbon-based organic solvent may be an aromatic hydrocarbon-based compound of Chemical Formula 2.

[Chemical Formula 2]

In Chemical Formula 2, $R_1$ to $R_6$ are the same or different and are selected from the group consisting of hydrogen, a halogen, a C1 to C10 alkyl group, a haloalkyl group, and a combination thereof.

Specific examples of the aromatic hydrocarbon-based organic solvent may be selected from the group consisting of benzene, fluorobenzene, 1,2-difluorobenzene, 1,3-difluorobenzene, 1,4-difluorobenzene, 1,2,3-trifluorobenzene, 1,2, 4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include an additive of vinylene carbonate or an ethylene carbonate-based compound of Chemical Formula 3 in order to improve cycle-life of a battery.

[Chemical Formula 3]

In Chemical Formula 3, $R_7$ and $R_8$ are the same or different and selected from hydrogen, a halogen, a cyano group (CN), a nitro group ($NO_2$), and a fluorinated C1 to C5 alkyl group, provided that at least one of $R_7$ and $R_8$ is selected from a halogen, a cyano group (CN), a nitro group ($NO_2$), and a fluorinated C1 to C5 alkyl group, and $R_7$ and $R_8$ are not simultaneously hydrogen.

Examples of the ethylene carbonate-based compound may be difluoro ethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving cycle-life may be used within an appropriate range.

The lithium salt dissolved in an organic solvent supplies a battery with lithium ions, basically operates the lithium secondary battery, and improves transportation of the lithium ions between a cathode and an anode. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are natural numbers, for example an integer ranging from 1 to 20), LiCl, LiI, and $LiB(C_2O_4)_2$ (lithium bis (oxalato) borate:LiBOB). A concentration of the lithium salt may range from 0.1 M to 2.0 M. When the lithium salt is included at the above concentration range, an electrolyte may have excellent performance and lithium ion mobility due to optimal electrolyte conductivity and viscosity.

As shown in FIG. 1, the separator 30 may be disposed between the cathode and the anode depending on a kind of a lithium secondary battery. Such a separator 30 may use polyethylene, polypropylene, polyvinylidene fluoride or multi-layers thereof having two or more layers and may be a mixed multilayer such as a polyethylene/polypropylene double-layered separator, a polyethylene/polypropylene/ polyethylene triple-layered separator, a polypropylene/poly- ethylene/polypropylene triple-layered separator, and the like.

MODE FOR INVENTION

Hereinafter, the disclosure will be specifically described through Examples.

Example 1

(1) Production of Cathode Active Material

A primarily-fired product was obtained by mixing $Ni_{0.85}Co_{0.14}Al_{0.01}(OH)_2$ and LiOH and primarily firing the mixture at 740° C. under an $O_2$ atmosphere for 21 hours.

The primarily-fired product was pulverized into powders and then, washed with distilled water to remove residual lithium on the surface thereof.

The washing was performed in a weight ratio of 0.5:1 between the distilled water and the powdered primarily-fired product.

The washed primarily-fired product was dried at 180° C. for 20 minutes and secondarily fired. The secondary firing was performed at 720° C. under an $O_2$ atmosphere and then, pulverized to prepare a cathode active material represented by $Li(Ni_{0.85}Co_{0.14}Al_{0.01})O_2$.

(2) Production of Lithium Secondary Battery Cell 94 wt % of the cathode active material prepared in the (1), 3 wt % of a polyvinylidene fluoride binder, and 3 wt % of a ketjen black conductive material were mixed in an N-methylpyrrolidone solvent to prepare a cathode active material composition. This cathode active material composition was coated on an Al current collector to manufacture a cathode.

The cathode, a lithium metal counter electrode, and an electrolyte were used to manufacture a coin-type half-cell in a common method. The electrolyte was prepared by dissolving 1.0 M $LiPF_6$ in a mixed solvent of ethylene carbonate and diethyl carbonate (a volume ratio of 50:50).

Example 2

A cathode active material was prepared according to the same method as Example 1 except that a kind of oxide included in the prepared cathode active material, whether or not of the drying or the secondarily firing, a weight ratio of the washing water and the primarily-fired product, and an amount of residual lithium on the surface were adjusted as shown in Table 1.

Subsequently, a cathode was manufactured according to the same method as Example 1 and then, used to manufacture a lithium secondary battery cell.

TABLE 1

| | Oxide | Drying process | Secondary firing process | Weight ratio of washing water and primarily-fired product |
|---|---|---|---|---|
| Example 1 | $Li(Ni_{0.85}Co_{0.14}Al_{0.01})O_2$ | Yes | Yes | 0.5:1 |
| Example 2 | $Li(Ni_{0.85}Co_{0.14}Al_{0.01})O_2$ | Yes | Yes | 1:1 |
| Example 3 | $Li(Ni_{0.85}Co_{0.14}Al_{0.01})O_2$ | Yes | Yes | 1:2 |
| Example 4 | $Li(Ni_{0.85}Co_{0.14}Al_{0.01})O_2$ | Yes | Yes | 1:4 |
| Example 5 | $Li(Ni_{0.85}Co_{0.14}Al_{0.01})O_2$ | Yes | Yes | 1:8 |
| Example 6 | $Li(Ni_{0.85}Co_{0.14}Mn_{0.01})O_2$ | Yes | Yes | 0.5:1 |
| Example 7 | $Li(Ni_{0.85}Co_{0.14}Mn_{0.01})O_2$ | Yes | Yes | 1:1 |
| Example 8 | $Li(Ni_{0.85}Co_{0.14}Mn_{0.01})O_2$ | Yes | Yes | 1:2 |

TABLE 1-continued

| | Oxide | Drying process | Secondary firing process | Weight ratio of washing water and primarily-fired product |
|---|---|---|---|---|
| Example 9 | Li(Ni$_{0.85}$Co$_{0.14}$Mn$_{0.01}$)O$_2$ | Yes | Yes | 1:4 |
| Example 10 | Li(Ni$_{0.85}$Co$_{0.14}$Mn$_{0.01}$)O$_2$ | Yes | Yes | 1:8 |
| Comparative Example 1 | Li(Ni$_{0.85}$Co$_{0.14}$Al$_{0.01}$)O$_2$ | None | Yes | 1:1 |
| Comparative Example 2 | Li(Ni$_{0.85}$Co$_{0.14}$Al$_{0.01}$)O$_2$ | Yes | Yes | 1:12 |
| Comparative Example 3 | Li(Ni$_{0.85}$Co$_{0.14}$Al$_{0.01}$)O$_2$ | Yes | None | 1:1 |
| Comparative Example 4 | Li(Ni$_{0.85}$Co$_{0.14}$Mn$_{0.01}$)O$_2$ | None | Yes | 1:1 |
| Comparative Example 5 | Li(Ni$_{0.85}$Co$_{0.14}$Mn$_{0.01}$)O$_2$ | Yes | Yes | 1:12 |
| Comparative Example 6 | Li(Ni$_{0.85}$Co$_{0.14}$Mn$_{0.01}$)O$_2$ | Yes | None | 1:1 |

Experimental Example 1

Each cathode active material according to Examples 1 to 10 and Comparative Examples 1 to 6 was analyzed, and the results are shown in Table 2.

An amount of residual lithium on the surface of the cathode active material was measured in an acid-base titration method by using diluted hydrochloric acid (HCl).

Figure 2:
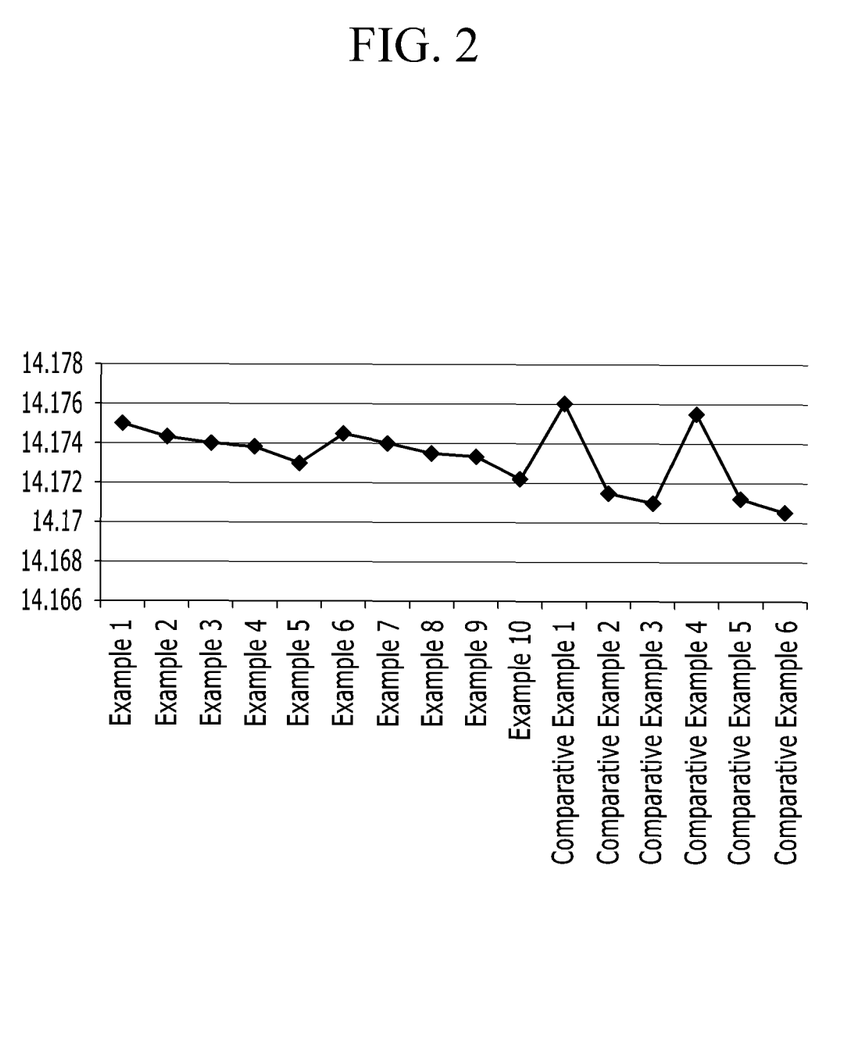
FIG. 2 is a graph showing c-axis lattice parameters of the cathode active materials according to Examples 1 to 10 and Comparative Examples 1 to 6.

A c-axis lattice parameter of a unit lattice of the cathode active material was calculated through Rietveld refinement from a profile obtained by an X-ray diffraction (XRD) analysis using Cu-Kα. The c-axis lattice parameter was expressed as a graph in FIG. 2.

Experimental Example 2

The lithium secondary battery cells according to Examples 1 to 10 and Comparative Examples 1 to 6 were respectively 100 times charged and discharged at 1C in a range of 2.8 V to 4.4 V at 25° C. to measure discharge capacity. In addition, a ratio of discharge capacity at the 100$^{th}$ cycle relative to discharge capacity at the 1$^{st}$ cycle was calculated to obtain capacity retention, which was called as a cycle life.

The results are shown in Table 2.

TABLE 2

| | Amount of residual lithium on the surface of active material (wt %) | Lattice parameter | | | Capacity retention (%) 1 C/1 C cycle |
|---|---|---|---|---|---|
| | | a (Å) | c (Å) | c/a | |
| Example 1 | 0.15 | 2.8661 | 14.1750 | 4.946 | 90.5 |
| Example 2 | 0.10 | 2.8667 | 14.1743 | 4.945 | 92.5 |
| Example 3 | 0.093 | 2.8671 | 14.1740 | 4.944 | 93.0 |
| Example 4 | 0.085 | 2.8672 | 14.1738 | 4.943 | 93.5 |
| Example 5 | 0.079 | 2.8673 | 14.1730 | 4.942 | 91.5 |
| Example 6 | 0.14 | 2.8656 | 14.1745 | 4.946 | 91.0 |
| Example 7 | 0.11 | 2.8662 | 14.1740 | 4.945 | 92.0 |
| Example 8 | 0.097 | 2.8666 | 14.1735 | 4.944 | 93.0 |
| Example 9 | 0.089 | 2.8667 | 14.1733 | 4.944 | 94.0 |
| Example 10 | 0.080 | 2.8668 | 14.1722 | 4.944 | 92.5 |
| Comparative Example 1 | 0.11 | 2.8655 | 14.176 | 4.947 | 87.0 |
| Comparative Example 2 | 0.065 | 2.8663 | 14.1715 | 4.944 | 88.0 |
| Comparative Example 3 | 0.095 | 2.8658 | 14.1710 | 4.945 | 70.0 |
| Comparative Example 4 | 0.10 | 2.8650 | 14.1755 | 4.948 | 88.0 |
| Comparative Example 5 | 0.070 | 2.8658 | 14.1712 | 4.945 | 87.0 |
| Comparative Example 6 | 0.095 | 2.8653 | 14.1705 | 4.946 | 85.5 |

Referring to Table 2, the lithium secondary battery cells of Examples 1 to 10 including a cathode active material having a c-axis lattice parameter ranging from greater than or equal to 14.172 Å and less than or equal to 14.175 Å according to an embodiment of this disclosure showed very excellent cycle-life characteristics.

On the contrary, the lithium secondary battery cells of Comparative Examples 1 to 6 including a cathode active material having a c-axis lattice parameter of less than 14.172 Å or greater than 14.175 Å showed remarkably deteriorated cycle-life characteristics compared with the ones of Examples.

Experimental Example 3

Figure 3:
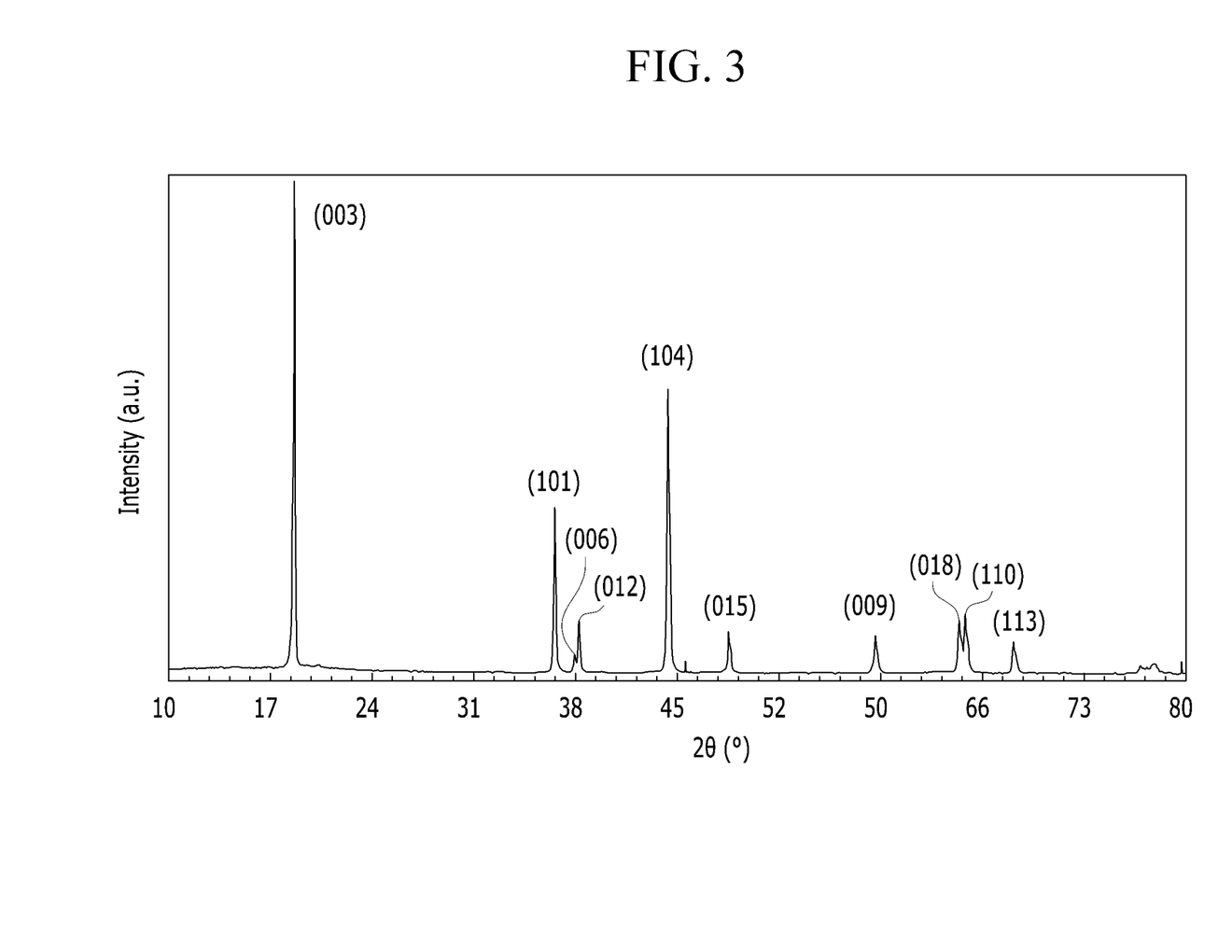
FIG. 3 is a graph showing x-ray diffraction of the cathode active material according to Example 1.
Figure 4:
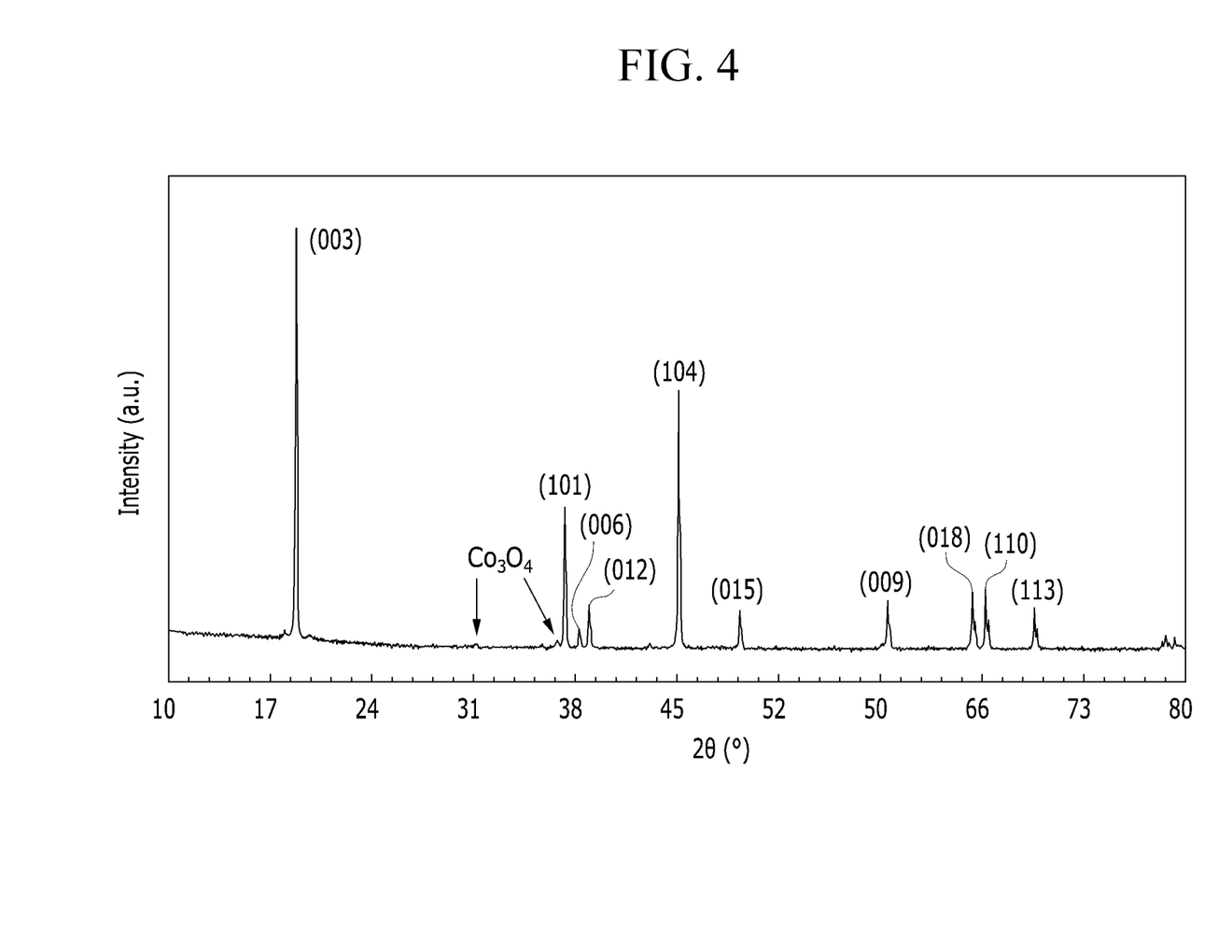
FIG. 4 is a graph showing x-ray diffraction of the cathode active material according to Comparative Example 1.
Figure 5:
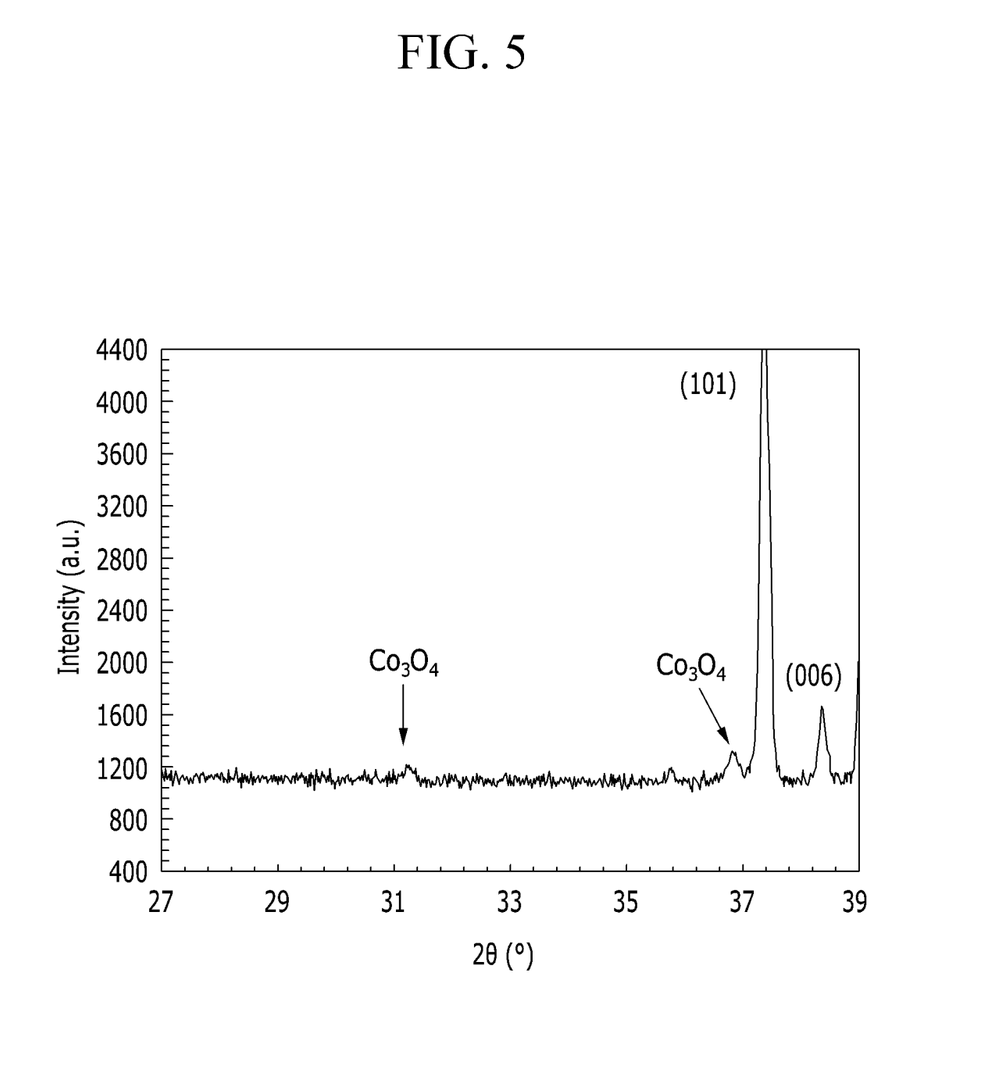
FIG. 5 is an enlarged view of FIG. 4 in a range of 2θ=27 degrees (°) to 39 degrees (°).

An x-ray diffraction (XRD) analysis using Cu-Kα was performed regarding the cathode active materials according to Example 1 and Comparative Example 1, and the results are shown in FIGS. 3 to 5.

Referring to FIG. 3, the X-ray spectrum result of the cathode active material according to Example 1 had no different diffraction peak from a diffraction peak on a 101 plane in a range of 25° to 38°.

Accordingly, the cathode active material according to Example 1 showed an additional phase except for an R-3m crystal structure, that is, impurities.

However, referring to FIG. 4 and FIG. 5 magnifying a range of 2θ=27° to 39° in FIG. 4, the cathode active material according to Comparative Example 1 had a diffraction peak about Co$_3$O$_4$ in addition to the diffraction peak on the 101 plane in a range of 25° to 38° and thus included impurities.

While this invention has been described in connection with what is presently considered to be practical exemplary embodiments, it is to be understood that the invention is not limited to the disclosed embodiments, and on the contrary, it is intended to cover various modifications and equivalent arrangements included within the spirit and scope of the appended claims.

DESCRIPTION OF SYMBOLS

100: lithium secondary battery
10: cathode
20: anode
30: separator
40: electrode assembly
50: case

The invention claimed is:

1. A cathode active material for a lithium secondary battery, comprising
lithium nickel composite oxide,
wherein a lattice parameter of a unit lattice of the lithium nickel composite oxide satisfies Formula 1, 14.172 Å≤c≤14.175 Å.

2. The cathode active material for the lithium secondary battery of claim 1, wherein
the lithium nickel composite oxide comprises a lithium compound disposed on a surface of the lithium nickel composite oxide, and
an amount of lithium included in the lithium compound is less than or equal to 0.25 parts by weight based on 100 parts by weight of the cathode active material.

3. The cathode active material for the lithium secondary battery of claim 2, wherein the amount of lithium included in the lithium compound is 0.05 parts by weight to 0.15 parts by weight based on 100 parts by weight of the cathode active material.

4. The cathode active material for the lithium secondary battery of claim 2, wherein the lithium compound comprises $Li_2CO_3$, LiOH, or a combination thereof.

5. The cathode active material for the lithium secondary battery of claim 1, wherein the lithium nickel composite oxide is represented by Chemical Formula 1, $Li_p(Ni_xCo_yMe_z)O_2$   [Chemical Formula 1]

wherein in Chemical Formula 1, 0.9≤p≤1.1, 0.8≤x≤0.9, 0<y≤0.3, 0<z≤0.3, x+y+z=1, and
Me is at least one of Al, Mn, Mg, Ti, and Zr.

6. The cathode active material for the lithium secondary battery of claim 1, wherein the cathode active material does not have other diffraction peaks other than a diffraction peak of a (101) plane in a range of 2θ=25 degrees (°) to 38 degrees (°) in an X-ray diffraction (XRD) measurement.

7. A method of preparing a cathode active material for a lithium secondary battery, comprising
mixing a nickel precursor and a lithium precursor to prepare a mixture and primarily firing the mixture to obtain a lithium-containing primarily-fired product;
pulverizing the lithium-containing primarily-fired product to obtain a pulverized lithium-containing primarily-fired product and washing the same to obtain a washed pulverized lithium-containing primarily-fired product;
drying the washed pulverized lithium-containing primarily-fired product to obtain a dried lithium-containing primarily-fired product; and
secondarily firing the dried lithium-containing primarily-fired product,
wherein the washing is performed so that a ratio of the pulverized lithium-containing primarily-fired product and washing water is 0.5:1 to 1:10.

8. The method of preparing the cathode active material for the lithium secondary battery of claim 7, wherein the drying is performed at a temperature of less than or equal to 200° C.

9. The method of preparing the cathode active material for the lithium secondary battery of claim 7, wherein the secondarily firing is performed at a temperature of greater than or equal to 600° C.

10. A lithium secondary battery, comprising
a cathode comprising the cathode active material of claim 1;
an anode comprising an anode active material; and
an electrolyte.

* * * * *